United States Patent
Goth et al.

(10) Patent No.: US 11,097,670 B2
(45) Date of Patent: Aug. 24, 2021

(54) METHOD FOR CALIBRATING IMAGE DATA OF AN IMAGING SYSTEM FOR A VEHICLE COMBINATION

(71) Applicant: Robert Bosch GmbH, Stuttgart (DE)

(72) Inventors: Martin Goth, Leonberg (DE); Jerg Pfeil, Cleebronn (DE); Uwe Maehnert, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/108,434

(22) Filed: Dec. 1, 2020

(65) Prior Publication Data
US 2021/0178984 A1    Jun. 17, 2021

(30) Foreign Application Priority Data
Dec. 11, 2019    (DE) .......................... 102019219386.2

(51) Int. Cl.
*B60R 11/04*    (2006.01)
*B60W 50/14*    (2020.01)

(52) U.S. Cl.
CPC ............. *B60R 11/04* (2013.01); *B60W 50/14* (2013.01); *B60R 2300/402* (2013.01); *B60W 2300/145* (2013.01); *B60W 2420/42* (2013.01)

(58) Field of Classification Search
CPC ........... G06K 9/00778; G06K 9/00785; G06K 9/00791; G06K 9/00798; G06K 9/00805; G06K 9/00812; G06K 9/00818; G06K 9/00825; G06K 9/00845; G06K 9/325; G06K 2209/15; G06K 2209/23;
(Continued)

(56) References Cited

U.S. PATENT DOCUMENTS 10,391,939 B2 *   8/2019   Naserian ................. B60R 1/002
2010/0194886 A1   8/2010   Asari et al.
(Continued)

FOREIGN PATENT DOCUMENTS

WO    WO-2020234440 A1 *   11/2020   ............. B60D 1/245

OTHER PUBLICATIONS

Balcerak et al. "Maneuver based assistance for backing up articulated vehicles" 2004 IEEE, 6 Pages. (Year: 2004).*

*Primary Examiner* — Nathnael Aynalem
(74) *Attorney, Agent, or Firm* — Norton Rose Fulbright US LLP; Gerard Messina

(57) ABSTRACT

A method for calibrating image data of an imaging system for a vehicle combination, including a first part of the tractor trailer, which encompasses the imaging system, and a second part which encompasses a calibration object, the second part being mechanically coupled to the first part so as to be movable about at least one axis. The imaging system is configured to at least partially representing the second part. The method includes: providing at least one image of the imaging system, which represents the calibration object; identifying the calibration object within the image; identifying a characteristic variable of the calibration object within the image; determining a deviation of the characteristic variable from a stored characteristic setpoint variable; generating calibrated image data by transforming the image data of the imaging system, depending on the deviation of the characteristic variable from the stored characteristic setpoint variable to compensate for the deviation.

14 Claims, 2 Drawing Sheets

(58) Field of Classification Search
CPC . G06T 2207/30236; G06T 2207/30248; G06T 2207/30252; G06T 2207/30256; G06T 2207/30261; G06T 2207/30264; G06T 2207/30268; G06T 7/70; G06T 7/80; G06T 7/97; G06T 7/73; G06T 7/74; G06T 7/75; G06T 2207/30244; G08G 1/16; G08G 1/116; G08G 1/167; G08G 1/168; G08G 1/20; B60W 50/14; B60W 2050/143; B60W 2550/10; B60W 2550/14; B60R 2001/1215; B60R 1/00; B60R 2025/1013; B60R 2025/1016; B60R 2300/105; B60R 2300/106; B60R 2300/806; B60R 2300/8066; B60R 2300/8073; B60R 2300/8086; B60R 2300/8093; B60R 1/003; G01S 17/93; G01S 17/931; B62D 15/029; H04W 4/40
USPC ............................................. 348/148
See application file for complete search history.

(56) References Cited

U.S. PATENT DOCUMENTS

| | | | |
|---|---|---|---|
| 2018/0276838 A1* | 9/2018 | Gupta | G01B 11/26 |
| 2018/0276839 A1* | 9/2018 | Diessner | G06T 7/73 |
| 2018/0357791 A1 | 12/2018 | Dworakowski et al. | |
| 2020/0215992 A1* | 7/2020 | Plowman | G06T 7/579 |

\* cited by examiner

METHOD FOR CALIBRATING IMAGE DATA OF AN IMAGING SYSTEM FOR A VEHICLE COMBINATION

CROSS REFERENCE

The present application claims the benefit under 35 U.S.C. § 119 of German Patent Application No. DE 102019219386.2 filed on Dec. 11, 2019, which is expressly incorporated herein by reference in its entirety.

BACKGROUND INFORMATION

The utilization of images for representing the surroundings for at least semi-automated platforms is a widespread field, since images generally contain a lot of information.

Such camera-based systems require a calibration for the assignment of the identified objects in the images to the objects in the surroundings, so that the appropriate two-dimensional image coordinates may be translated into an appropriate three-dimensional structure in the vehicle coordinate system.

This calibration is normally divided into the intrinsics, which relate to the camera's own parameters, such as focal length and focal point or viewpoint, and the extrinsics, which relate to the position and orientation in vehicle coordinates.

The three-dimensional coordinate systems usually have their origin in a fixed point at the vehicle itself. A calibration of camera systems is generally carried out at a test bench, with the aid of a calibration panel.

SUMMARY

In using a system of this type, it may happen, during travel, that a position and/or an orientation for the camera system has changed. The reasons therefor may be, for example, for a truck, weight transfers, for example, due to a change of tire pressure, fuel consumption, or also a deformation of the chassis of the truck due to the effects of heat and cold.

Changes in the orientation by only a portion of an angular degree may result in an error of several percent at a greater distance from the sensor. This limits the quality of the objects detected by the camera system and has an adverse effect on the overall performance of the driving system.

Existing approaches for a calibration during travel are limited to the extrinsic calibration. For this purpose, an unchanging feature in the surroundings is sought. Since the surroundings naturally change during travel, this is not to be determined at an arbitrary point in time. Therefore, an identified feature is observed over a longer period of time and the results are integrated, in order to virtually approximate an unchanging feature in this way.

Such a feature may be, for example, the focus of expansion resulting from the optical flow, road markings, or the horizon. The basic assumption of these systems remains that changes of the features even out on average, since the focus of expansion is always directed in a travel direction or counter to a travel direction, road markings are, on average, always straight and parallel to the vehicle, or a horizon is, on average, flat and at viewing height.

It is therefore provided, in accordance with an example embodiment of the present invention, to solve such a problem with the aid of a prompt correction in the form of a calibration during travel.

Rearward-directed cameras, in particular in the case of tractor trailers, typically detect images of trailers. This trailer may be utilized as an unchanging feature for calibration. The camera system may utilize outer dimensions of the trailer itself as a calibration pattern, when dimensions of the trailer are known for this purpose before a trip.

For example, in the case of box-shaped trailers, the edges of the trailer may be utilized during the day and the position lights may be utilized at night for such a calibration. Alternatively or additionally, in the case of trailers, patterns having known dimensions may be applied onto outer surfaces, which may be detected with the aid of a camera system. The inaccuracy of the trailer articulation angle, i.e., in other words, the angle between a leading vehicle and a trailer of the vehicle, may be identified and taken into consideration with the aid of integration over a longer period of time, assuming that the trailer travels, on average, straight behind the vehicle. Due to the use of a commercially available system for determining the articulation angle, for example, in the kingpin, or with the aid of another system for estimating the trailer articulation angle, the articulation angle may be directly compensated for. As a result, the integration time for determining the extrinsic calibration is shortened. Moreover, detected dimensions of the trailer also allow for an intrinsic calibration.

The present invention provides a method for calibrating image data of an imaging system for a vehicle combination, a device, a utilization of a computer program, a computer program, and a machine-readable memory medium. Advantageous embodiments of the present invention are described herein.

In this entire description of the present invention, the sequence of method steps is represented in such a way that the method is easy to understand. Those skilled in the art will recognize, however, that many of the method steps may also be carried out in another order and yield the same result. In this sense, the order of the method steps may be appropriately changed and, therefore, is also provided.

According to one aspect of the present invention, a method is provided for calibrating image data of an imaging system for a vehicle combination including a first part of the tractor trailer, which encompasses the imaging system for generating images, and a second part of the tractor trailer, which encompasses a calibration object. The second part of the tractor trailer is mechanically coupled to the first part of the tractor trailer so as to be movable about at least one axis, and the imaging system is configured for at least partially imaging the second part of the tractor trailer.

In accordance with an example embodiment of the present invention, in one step of the method, at least one image of the imaging system, which represents the calibration object, is provided. In one further step, the calibration object is identified within the image.

In one further step, a characteristic variable of the calibration object is identified within the image.

In one further step, a deviation of the characteristic variable of the calibration object within the image from a stored characteristic setpoint variable of the calibration object is determined within the image.

In one further step, calibrated image data are generated by transforming the image data of the imaging system, depending on the deviation of the characteristic variable from the stored characteristic setpoint variable of the calibration object, in order to compensate for the deviation.

A calibration object is an object, which may be detected by the imaging system and whose features are sufficiently precisely known for the method to carry out the calibration.

A vehicle combination of this type, which includes a first and a second part of the tractor trailer, means any combination of vehicles, between which a movable connection exists during travel.

Advantageously, this method may be carried out during travel and, with the aid of known calibration objects, it is possible to carry out an intrinsic calibration. A calibration of this type is possible even without the presence of external light, i.e., in particular even at night, provided the calibration objects are self-illuminating. In particular, existing position lights may be utilized as a calibration object. Without external illumination, such as at night, the calibration with the aid of self-illuminating objects is particularly advantageous, since the estimation of distances to other road users at night depends, in particular, on the quality of the calibration.

According to one aspect of the present invention, it is provided that the images are generated from a plurality of imaging systems, in particular from two imaging systems, which at least partially represent the second part of the tractor trailer. Due to the utilization of a plurality of imaging systems, a more precise calibration may be carried out when the particular individually generated images are compared to one another, or when the imaging systems are based on different types of imaging systems.

According to one aspect of the present invention, it is provided that the calibration object encompasses features of the second part of the tractor trailer. Since these features may also be, for example, parts of the lighting system, this yields the advantage of this method that a calibration may also be carried out at night.

According to one aspect of the present invention, it is provided that at least one calibration object is applied on an outer surface of the second part of the tractor trailer.

According to one aspect of the present invention, it is provided that the characteristic setpoint variable of the calibration object is determined depending on a type of the second part of the tractor trailer. The type of the second part of the tractor trailer is identified in one step. In one further step, the characteristic setpoint variable of the calibration object of the type of the second part of the tractor trailer is determined with the aid of an allocation table.

An allocation table of this type lists the different types of parts of the tractor trailer and contrasts them with the characteristic setpoint variables of appropriate calibration objects, so that, when the type of part of the tractor trailer is known, the characteristic setpoint variables of the calibration objects for the method are known.

According to one aspect of the present invention, it is provided that the identification of the type of the second part of the tractor trailer takes place with the aid of an identification method between the first part of the tractor trailer and the second part of the tractor trailer. With the aid of an identification method of this type, this yields the advantage that the characteristic setpoint variables do not need to be manually provided to the method.

According to one aspect of the present invention, it is provided that the identification method takes place with the aid of a wireless identification method between the first part of the tractor trailer and the second part of the tractor trailer. In order to ensure that the calibration method may be carried out with the aid of a plurality of second parts of the tractor trailer, it is advantageous that at least the type, but, in particular, also the setpoint variables of the calibration objects are wirelessly made available for the method by the second part of the tractor trailer to the first part of the tractor trailer, so that a changeover of second parts of the tractor trailer may be carried out comfortably and reliably.

According to one aspect of the present invention, it is provided that the identification method is based on a barcode method and/or an RFID method and/or on a transmission with the aid of a vehicle bus (CAN). The term "based on" is to be broadly understood, with respect to the feature, to mean that the identification method is based on a barcode method and/or an RFID method. It is to be understood that any utilization of the aforementioned methods is used for the identification method, this not ruling out that other input variables are also utilized for the identification method. With the aid of this identification method, an economically favorable identification of second parts of the tractor trailer is possible.

According to one aspect of the present invention, it is provided that the imaging system is a camera system, a video system, a LIDAR system, or a radar system. Therefore, the calibration method may be applied for different imaging methods and adapted to specific circumstances.

According to one aspect of the present invention, it is provided that the calibrated image data are generated with the aid of the following method steps. In one step, the deviation of the characteristic variable of the calibration object within the image from the stored characteristic setpoint variable of the calibration object within the image is determined for a plurality of images, which were generated by the imaging system at different times. In one further step, the deviation is calculated from an averaged value of the particular deviation of the plurality of images.

According to one aspect of the present invention, it is provided that the calibrated image data are generated with the aid of the following method steps. In one step of the method, the deviation of the characteristic variable of the calibration object within the image from the stored characteristic setpoint variable of the calibration object within the image is determined for a plurality of images, which were generated by the imaging system at different times. In one further step, an angle between the first part of the tractor trailer and the second part of the tractor trailer is determined for each of the plurality of images. In one further step, the deviation is calculated from an averaged value across the plurality of images at a defined angle between the first part of the tractor trailer and the second part of the tractor trailer. Due to this articulation angle compensation, in addition to an elimination of longer-term calibration errors, short-term errors may also be detected and compensated for, which occur, for example, due to a tire blowout. Therefore, with the aid of the method, the higher requirements on redundancy and reliability are also met, of the type that are necessary for autonomous travel.

According to one aspect of the present invention, it is provided that, for an, in particular, extrinsic calibration of the imaging system, the characteristic variable of the calibration object is a position of at least one portion of the calibration object in the image of the imaging system, and the image data are transformed, in that the image data are converted into a new reference system of the calibrated image data.

Advantageously, in this way, a zero point and/or a rotation may be compensated for with the aid of the calibration.

According to one aspect of the present invention, it is provided that, for an, in particular, intrinsic calibration of the imaging system, the characteristic variable of the calibration object is a length of at least one portion of the calibration object in the image of the imaging system, and the image data are transformed, in that a length transformation and/or rotation and/or a translation and/or a focus shift of the image data to the calibrated image data are/is calculated.

Advantageously, in this way, a size of the image, a shifting, a twisting, and a change of the focal point and/or of the viewpoint may be compensated for with the aid of the calibration.

According to one aspect of the present invention, it is provided that, based on the certain deviation of the characteristic variable of the calibration object from a stored characteristic setpoint variable of the calibration object, a control signal may be provided for activating an at least semi-automated vehicle combination. Alternatively or additionally, based on the certain deviation of the characteristic variable of the calibration object from a stored characteristic setpoint variable of the calibration object, a warning signal is provided for warning an occupant of the vehicle combination.

It may therefore be ensured that occupants of the vehicle combination or also automatic or semi-automatic systems are supplied with sufficiently precise information when they utilize images of the imaging systems for guiding the vehicles.

In accordance with an example embodiment of the present invention, a device is provided, which is configured for carrying out one of the above-described methods. With the aid of a device of this type, the method may be easily integrated into different systems.

In accordance with an example embodiment of the present invention, a computer program is provided, which includes commands, which, when the program is carried out with the aid of a computer, prompt the computer to carry out one of the above-described methods. A computer program of this type allows for the use of the described method in different systems.

In accordance with an example embodiment of the present invention, a machine-readable memory medium is provided, on which the above-described computer program is stored.

The described methods in accordance with the example embodiments of the present invention may be utilized, in particular, for an operation of at least semi-automated mobile platforms. A mobile platform may be understood to be an at least semi-automated system, which is mobile, and/or a driver assistance system of a vehicle. One example may be an at least semi-automated vehicle or a vehicle including a driver assistance system. This means, in this context, that an at least semi-automated system contains a mobile platform with respect to an at least semi-automated functionality, but a mobile platform also contains vehicles and other mobile machines, including driver assistance systems. Further examples for mobile platforms may be driver assistance systems encompassing multiple sensors, mobile multisensor robots, such as robotic vacuum cleaners or lawn mowers, a multisensor monitoring system, a production machine, a personal assistant, a ship, an aircraft, a shuttle, a robotaxi, commercial vehicles, or an access control system. Each of these systems may be a fully or semi-automated system.

BRIEF DESCRIPTION OF THE DRAWINGS

Exemplary embodiments of the present invention are represented with reference to FIGS. 1a and 1b, and 2 and are explained in greater detail below.

DETAILED DESCRIPTION OF EXAMPLE EMBODIMENTS

Figure 1A:
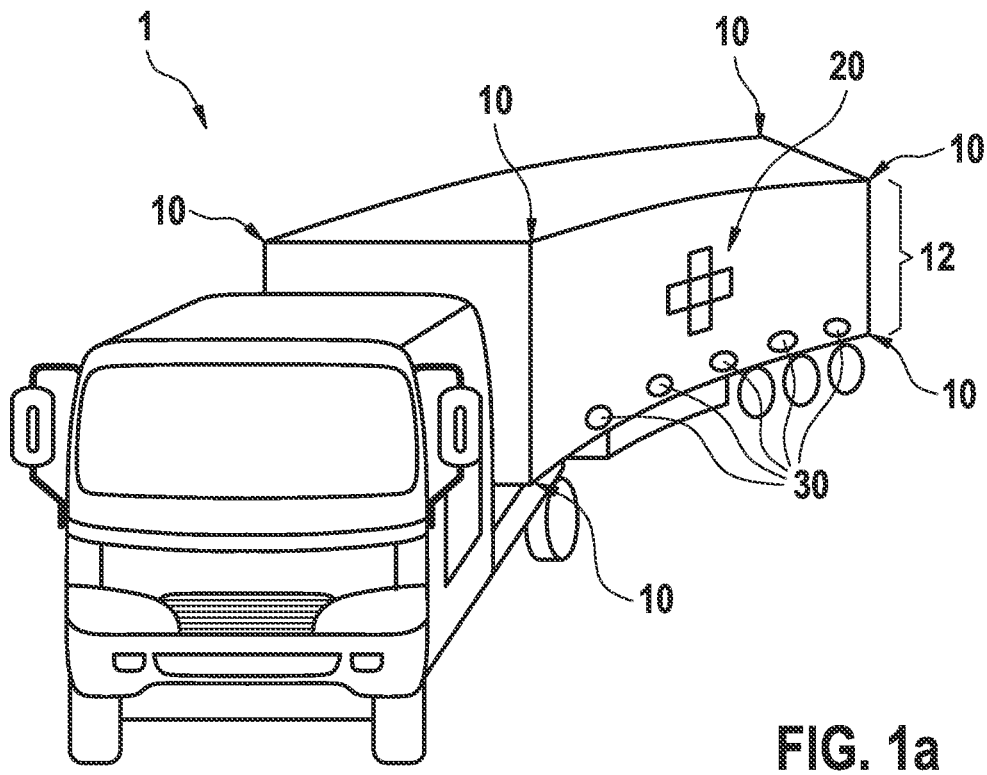
FIG. 1a shows a layout of a vehicle combination including a first and a second part of the tractor trailer in a perspective view.

FIG. 1a outlines a vehicle combination 1 having characteristic variables 10, 12, 20, 30 of the second part of the tractor trailer. The points of the second part of the tractor trailer labeled with 10 indicate possible characteristic points. Characteristic length 12 between two points provided with reference numeral 10 outlines the possibility of deriving characteristic variables from identified characteristic points. A calibration object 20 for a calibration is applied on the lateral wall of the second part of the tractor trailer. The points provided with reference numeral 30 represent self-illuminating position lights, with the aid of which a calibration may be carried out even without external illumination, i.e., for example, at night.

Figure 1B:
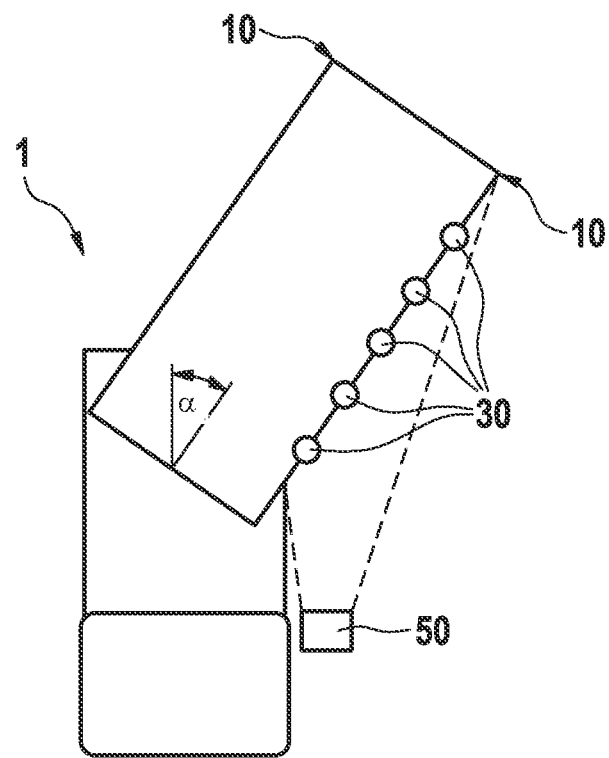
FIG. 1b shows a layout of a vehicle combination including a first and a second part of the tractor trailer from a top view.

FIG. 1b outlines the same situation of vehicle combination 1 from an aerial view, in which above-described characteristic points 10, 30 are emphasized and it is indicated how an imaging system 50 may detect characteristic points 10, 30. In the outlined situation, calibration object 20 described in FIG. 1a may be additionally detected with the aid of imaging system 50, since it is situated in the detection range of imaging system 50. In addition, an articulation angle between the first part of the tractor trailer and the second part of the tractor trailer is indicated with the aid of angle alpha.

Figure 2:
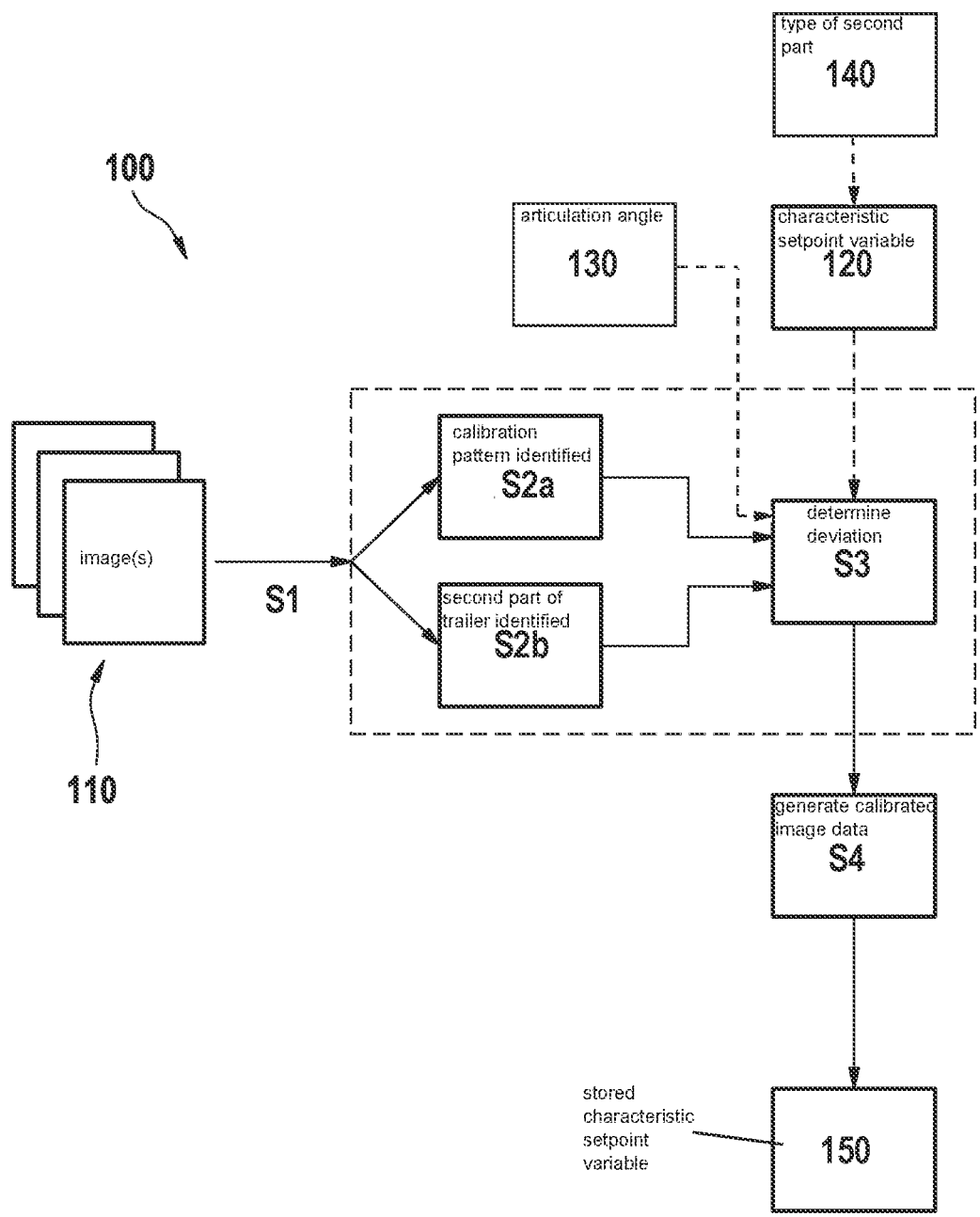
FIG. 2 shows a diagram including method steps for calibrating image data, in accordance with an example embodiment of the present invention.

FIG. 2 schematically outlines method 100 for calibrating image data. In one step S1 of method 100, at least one image 110 of the imaging system, which represents the calibration object, is provided.

In one further step S2a, S2b, a calibration object 10, 12, 20, 30 is identified within image 110 and a characteristic variable of calibration object 10, 12, 20, 30 is identified within image 110. In the outlined method sequence, a distinction is made as to whether a calibration pattern 20 is identified in image 110 in method step S2a or whether specific features 10, 12, 30 of the second part of the tractor trailer are identified in image 110 in method step S2b.

In one further step S3, a deviation of the characteristic variable of the calibration object within the image from a stored characteristic setpoint variable 120 of the calibration object within the image is determined. Characteristic setpoint variable 120 may depend on type 140 of the second part of the tractor trailer when the dimensions of the second part of the tractor trailer characterize the characteristic variables. When, alternatively or additionally, a calibration pattern is identified, the determination of the type may be dispensed with, provided only one calibration pattern is always utilized. In the determination of the deviation of the characteristic variable of the calibration object from a stored characteristic setpoint variable 120, articulation angle 130 between the first part of the tractor trailer and the second part of the tractor trailer may also be taken into account, provided an appropriate value 130 may be provided. In particular when an articulation angle value 130 may not be provided, the identified characteristic variable of the calibration object within the image may be averaged over time.

In one further step S4, calibrated image data 170 are generated by transforming the image data of the imaging system, depending on the deviation of the characteristic variable from stored characteristic setpoint variable 150 of the calibration object, in order to compensate for the deviation.

What is claimed is:

1. A method for calibrating image data of an imaging system for a vehicle combination, the vehicle combination including a first part of a tractor trailer, which encompasses the imaging system for generating images, and a second part of the tractor trailer, which encompasses a calibration object, the second part of the tractor trailer being mechanically coupled to the first part of the tractor trailer so as to be movable relative to the first part of the tractor trailer about at least one axis, the imaging system being configured to at least partially represent the second part of the tractor trailer, the method comprising the following steps:
   providing at least one image of the imaging system, which represents the calibration object;
   identifying the calibration object within the image;
   identifying a characteristic variable of the calibration object within the image;
   determining a deviation of the characteristic variable of the calibration object within the image from a stored characteristic setpoint variable of the calibration object within the image; and
   generating calibrated image data by transforming the image data of the imaging system, depending on the deviation of the characteristic variable from the stored characteristic setpoint variable of the calibration object to compensate for the deviation.

2. The method as recited in claim 1, wherein the characteristic setpoint variable of the calibration object is determined depending on a type of the second part of the tractor trailer, and the method further includes the following steps:
   identifying the type of the second part of the tractor trailer; and
   determining the characteristic setpoint variable of the calibration object of the type of the second part of the tractor trailer using an allocation table.

3. The method as recited in claim 2, wherein the identification of the type of the second part of the tractor trailer takes place using an identification method between the first part of the tractor trailer and the second part of the tractor trailer.

4. The method as recited in claim 3, wherein the identification method takes place using a wireless identification method between the first part of the tractor trailer and the second part of the tractor trailer.

5. The method as recited in claim 3, wherein the identification method is based on a barcode method and/or an RFID method and/or on a transmission using a vehicle bus.

6. The method as recited in claim 1, wherein the imaging system is a camera system, or a video system, or a LIDAR system, or a radar system.

7. The method as recited in claim 1, wherein the calibrated image data are generated, using the following steps:
   determining the deviation of the characteristic variable of the calibration object within the image from the stored characteristic setpoint variable of the calibration object within the image for a plurality of images, which were generated by the imaging system at different times; and
   calculating the deviation from an averaged value of the deviation of the plurality of images.

8. The method as recited in claim 1, wherein the calibrated image data are generated, using the following steps:
   determining the deviation of the characteristic variable of the calibration object within the image from the stored characteristic setpoint variable of the calibration object within the image for a plurality of images, which were generated by the imaging system at different times; and
   determining an angle between the first part of the tractor trailer and the second part of the tractor trailer for each of the plurality of images; and
   calculating the deviation from an averaged value across the plurality of images at a defined angle between the first part of the tractor trailer and the second part of the tractor trailer.

9. The method as recited in claim 1, wherein, for a calibration of the imaging system, the characteristic variable of the calibration object is a position of at least one portion of the calibration object in the image of the imaging system, and the image data are transformed, in that the image data are converted into a new reference system of the calibrated image data.

10. The method as recited in claim 1, wherein, for a calibration of the imaging system, the characteristic variable of the calibration object is a length of at least one portion of the calibration object in the image of the imaging system, and the image data are transformed, in that a length transformation and/or a rotation of the image data and/or a translation of the image data and/or a focus shift of the image data to the calibrated image data, is calculated.

11. The method as recited in claim 1, wherein: (i) based on the deviation of the characteristic variable of the calibration object from the stored characteristic setpoint variable of the calibration object, a control signal for activating an at least semi-automated vehicle combination is provided; and/or (ii) based on the deviation of the characteristic variable of the calibration object from the stored characteristic setpoint variable of the calibration object, a warning signal is provided for warning an occupant of the vehicle combination.

12. A device configured to calibrate image data of an imaging system for a vehicle combination, the vehicle combination including a first part of a tractor trailer, which encompasses the imaging system for generating images, and a second part of the tractor trailer, which encompasses a calibration object, the second part of the tractor trailer being mechanically coupled to the first part of the tractor trailer so as to be movable relative to the first part of the tractor trailer about at least one axis, the imaging system being configured to at least partially represent the second part of the tractor trailer, the device configured to:
   provide at least one image of the imaging system, which represents the calibration object;
   identify the calibration object within the image;
   identify a characteristic variable of the calibration object within the image;
   determine a deviation of the characteristic variable of the calibration object within the image from a stored characteristic setpoint variable of the calibration object within the image; and
   generate calibrated image data by transforming the image data of the imaging system, depending on the deviation of the characteristic variable from the stored characteristic setpoint variable of the calibration object to compensate for the deviation.

13. The method as recited in claim 1, wherein the method is used for controlling the vehicle combination, the vehicle combination being an at least semi-automated vehicle combination.

14. A non-transitory machine-readable memory medium on which is stored a computer program for calibrating image data of an imaging system for a vehicle combination, the vehicle combination including a first part of a tractor trailer, which encompasses the imaging system for generating images, and a second part of the tractor trailer, which encompasses a calibration object, the second part of the tractor trailer being mechanically coupled to the first part of the tractor trailer so as to be movable relative to the first part of the tractor trailer about at least one axis, the imaging system being configured to at least partially represent the second part of the tractor trailer, the computer program, when executed by a computer, causing the computer to perform the following steps:

providing at least one image of the imaging system, which represents the calibration object;

identifying the calibration object within the image;

identifying a characteristic variable of the calibration object within the image;

determining a deviation of the characteristic variable of the calibration object within the image from a stored characteristic setpoint variable of the calibration object within the image; and generating calibrated image data by transforming the image data of the imaging system, depending on the deviation of the characteristic variable from the stored characteristic setpoint variable of the calibration object to compensate for the deviation.

* * * * *